United States Patent [19]
Trell

[11] Patent Number: 5,467,386
[45] Date of Patent: Nov. 14, 1995

[54] METHOD FOR SIGNALLING/COMMUNICATION WITHIN AN ENTRANCE TELEPHONE SYSTEM AND AN ENTRANCE TELEPHONE SYSTEM COMMUNICATING ACCORDING TO THE METHOD

[76] Inventor: Anders E. Trell, Hogalidsgatan 27, Stockholm, Sweden, S-117 30

[21] Appl. No.: 94,011

[22] PCT Filed: Dec. 27, 1991

[86] PCT No.: PCT/SE91/00911

§ 371 Date: Jul. 23, 1993

§ 102(e) Date: Jul. 23, 1993

[87] PCT Pub. No.: WO92/13418

PCT Pub. Date: Aug. 6, 1992

[30] Foreign Application Priority Data

Jan. 29, 1991 [SE] Sweden ................................ 9100277

[51] Int. Cl.⁶ ................................................ H04M 11/00
[52] U.S. Cl. ................................................ 379/103
[58] Field of Search ................................ 379/102–105, 379/90, 110

[56] References Cited

U.S. PATENT DOCUMENTS 4,987,589  1/1991  Trell ........................................ 379/103

*Primary Examiner*—Wing F. Chan
*Attorney, Agent, or Firm*—Jacobson, Price, Holman & Stern

[57] ABSTRACT

A method for signalling/communication within an entrance telephone system or similar, and a system utilizing the method, which facilitates selective communication from an entrance center or central unit (1) to a desired and addressed substation (5, 5', 5") via a loop including at least two conductors, and which also facilitates entrance lock opening or a similar function from such a substation (5, 5', 5"). After approved addressing operation of the central unit (1) is performed by a visitor, the central unit (1) feeds work current to the loop (2, 2') joining the central unit (1) and connected substations (5, 5', 5"). By using a signal detecting means (6, 6', 6") only the addressed substation (5, 5', 5") then establishes a galvanical connection with the loop (2, 2') and the central unit (1). The central unit (1) performs thereafter generation of a ring signal, detection of "off-hook" or other statuses or signalling changes, and on detection of an incomplete reply, or terminated entrance telephone communication/function, the feeding of work current to the loop is interrupted. Address information from the central unit (1) is preferably transferred using a signalling type different from the signalling type whereby substations (5, 5', 5") connected to the loop (2, 2') can influence the central unit (1) during an established connection in order to initiate entrance lock opening or other functions.

12 Claims, 2 Drawing Sheets

METHOD FOR SIGNALLING/COMMUNICATION WITHIN AN ENTRANCE TELEPHONE SYSTEM AND AN ENTRANCE TELEPHONE SYSTEM COMMUNICATING ACCORDING TO THE METHOD

FIELD OF THE INVENTION

The present invention relates to a method for signalling/communication within an entrance telephone system or similar, and a system which operates according to the method.

BACKGROUND OF THE INVENTION

Within an entrance telephone system, the connection of subscribers/tenants is usually carried out using a 2-wire circuit for verbal communication, and a further 2-wire circuit is used to control the entrance lock in such a way that an opening operation is performed. When additional tenants are connected to a circuit having only 2×2 wires as disclosed above, each subscriber requires a substation, which, for example, can be addressed using PCM-signalling techniques (Pule Code Modulation), in order to facilitate the possibility of selectively calling and establishing communication with a certain chosen subscriber. A galvanical make operation for the pair of cables influencing the entrance lock will initiate an opening operation. However, this solution involves major problems, e.g. since a subscriber not replacing the handset will block the circuit, and also since intervention of calls in progress and opening operation can be performed by subscribers other than the party presently called. An alternative solution is to use more conventional connection techniques ("switching") with selection of subscriber by means of delays or the like, involving use of separate cables or successively reduced group of cables. Communication secrecy and opening operation exclusivity can thus be accomplished, but not guaranteed to 100% due to capacitive coupling between included wires. Such systems also involve problems with regard to service, maintenance and repair. In order to prevent a non-replaced handset of any of the subscribers from blocking the loop completely, a relatively complicated surveillance technique is often required within the entrance center. Particularly for large installations, wiring will often be complicated, multiwired and expensive. The cost for the entrance center with associated switching means and the piece cost for each substation should also be added hereto. When a "loop" has been completed, any increase/reduction of the number of substations also involves large problems.

SUMMARY OF THE INVENTION

The object of the present invention is to provide a method and a system which removes the problems discussed above, and which offers simple switching techniques and installation/wiring using a simple 2-wire circuit. Furthermore, complete communication secrecy, opening exclusivity and protection against blocking caused by "off-hook" is achieved.

The method according to the present invention for signalling/communication within an entrance telephone system or the like is intended to facilitate selective communication from an entrance center or central unit to a desired and addressed substation via a loop including at least two conductors, and also facilitate entrance lock opening or similar functions from such a substation. According to the method, the central unit, after an approved addressing operation is performed by a visitor, as a first step, feeds work current to the loop joining the central unit and connected substations. The central unit in connection herewith transmits an address code unique for the addressed substation. The addressed substation, using a signal detecting means, then establishes a galvanical connection between loop and substation. The central unit performs generation of a ring signal, detection of "off-hook" or other statuses or signalling changes. The central unit on detection of an incomplete reply, or terminated entrance telephone communication/function, interrupts the feed of work current to the loop.

The entrance telephone system according to the present invention includes an entrance center or central unit arranged to facilitate selective communication with a desired and addressed substation via a loop including at least two conductors, and also facilitate entrance lock opening or similar functions from such a substation. During operation of the entrance telephone system, a work current is only fed to the communication loop after completed approved addressing of a substation. The address information is transmitted to the loop as an addressing code unique to the addressed substation. Each substation includes a terminal unit with a preprogrammed unit arranged to detect the address information transmitted from the central unit, and on receipt of a correct individual address code connects the associated substation into galvanical connection with the loop. An established connection is maintained as long as work current feed is being maintained. The central unit, during a predetermined time period after addressing, monitors the loop for an indication of "off-hook" or other statuses or signal changes. In addition, the central unit, after expiration of the time period and nonreceipt of such an indication, interrupts the feeding of work current to the loop, or when such an indication is obtained, monitors for an indication of "on-hook" or other statuses or functions signals, and as a response thereto performs the function and/or interrupts the feeding of work current to the loop.

BRIEF DESCRIPTION OF THE DRAWINGS

The method according to the present invention, and examples of a system utilizing the method, will be more fully described below with reference to the accompanying drawings, in which.

DETAILED DESCRIPTION OF THE PREFERRED EMBODIMENTS

Figure 1:
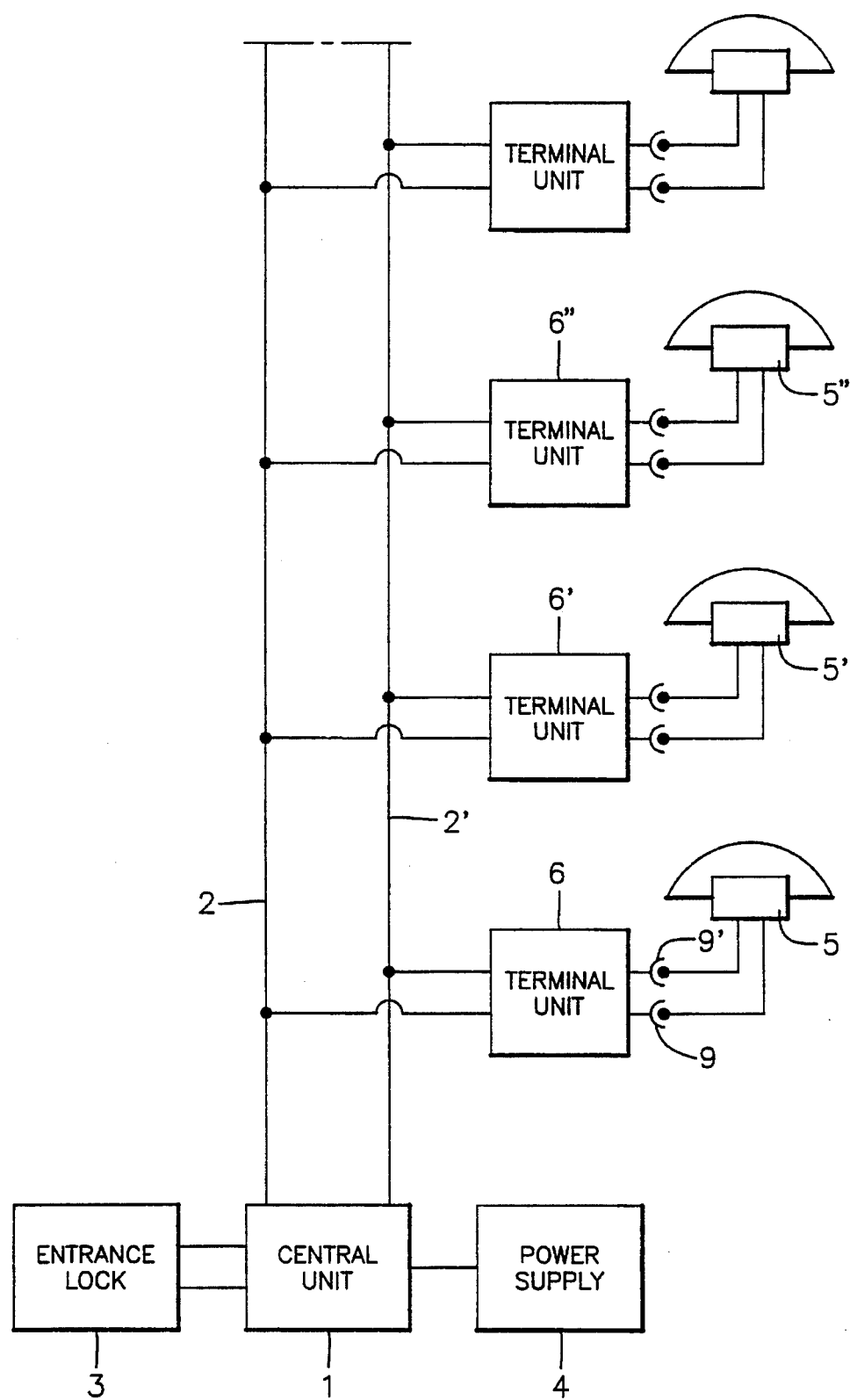
FIG. 1 is a block diagram disclosing an example of an installation according to the present invention.

With reference to FIG. 1, an example of an installation according to the present invention is shown as a block diagram.

A central unit 1, including the various parts required to facilitate addressing of a desired tenant, as for example a keypad and means for verbal communication with the tenant, is shown connected to a 2-wire circuit 2, 2'. The units used to accomplish addressing/communication can either be integrated with the central unit 1, or comprise an individual unit, electrically connected to the central unit 1. It is further shown that the central unit 1 is electrically connected to an electrically operable entrance lock 3, which by means of electrical influence can perform an opening operation. A power supply 4 is also shown connected to the central unit 1, arranged to facilitate an electrical voltage feed to the installation. Finally, the 2-wire circuit 2, 2' is shown connected to a number of substations 5, 5', 5" via individual terminal units 6, 6', 6" for each substation, 5, 5', 5". The substations 5, 5', 5" are indicated as conventional telephone sets.

An installation of the above disclosed type differs in a number of ways from a system for internal communication of the intercom system type, first and foremost since only one station should be able to call and communicate with substations, and the substations should not be able to call or communicate internally with each other, but apart from communication, they should also be arranged to send an operation signal back to the calling station, and this should be accomplished with full integrity.

The example of an embodiment according to the invention as shown in FIG. 1 meets these requirements, since the individual substations 5, 5', 5" never by themselves can accomplish line connection, since they are normally always maintained in status "on-hook". The central unit 1 ("the entrance center") controls/accomplishes by itself "line connection" ("off-hook") for the individual substations, and does not monitor for galvanical status or signalling indications, but for logical signals (for reply and opening indication). The substations 5, 5', 5" can be selectively chosen by the central unit 1.

The central unit 1 ("the entrance center") shown in FIG. 1 includes a programmable microprocessor, and necessary parts for audio communication are also included in a known fashion. A keypad is preferably used to offer a visitor addressing capability when making a call, and connection with a chosen substation 5, 5', 5" to permit conversation is only performed when an accepted code sequence has been entered. Apart from addressing by means of a keypad, also other alternatives can be used, as for example optical, acoustical, magnetic or card readers.

By replacing the shown 2-wire circuit 2, 2' with, for example, a single coaxial cable, which facilitates an improved wide-band transmission, video communication can also be offered in addition to audio communication, which obviously requires that additional equipment such as video camera/monitors are arranged.

When a visitor has entered a number sequence accepted by the microprocessor in the central unit 1, the following steps are performed:

A: The entire loop from the central unit 1 (in the shown embodiment the wires 2, 2') is connected to receive a work feed current, i.e. the loop is otherwise normally without an electric current or connected to a standby current insufficient for the functions described below.

B: A data code corresponding to the number sequence entered by the visitor is transmitted over the entire loop and reaches among others the terminal unit 6, 6', 6" with associated substation 5, 5', 5" which has been programmed for this code.

C: A ring signal is oscillated out to the loop.

These three steps are performed as a fast and almost immediate sequence, and results in the following:

I A switch means 7, 8 in the terminal unit/substation 6, 6', 6"; 5, 5', 5" which has "the correct code" performs a make function (feed current exists according to "A" above, and addressing has been carried out according to "B").

II The switch means, in the embodiment shown being a PCM-code addressable unit 7, which on receipt of a predetermined code sequence accomplishes a make function for a high-resistive make-maintaining relay 8, which on make is given current feed accomplished by the fact that a current is fed to the loop (according to "A" above), and the relay 8 will thus maintain the make condition as long as the current is fed to the loop, whereafter the same is automatically reset into a rest position in an open circuit condition.

III The connections 9, 9' only at the addressed terminal unit will associated substation 6, 6', 6"; 5, 5', 5" will thus receive a current feed (according to "A" above) and ring signal (according to "C" above), whereas all the remaining substations still remain "without current", and thus completely uninfluenced.

Accordingly, connected but not addressed substations can not function, obtain line access, transmit signals or block the circuit by "off-hook"; it is in fact of no significance whether or not they are connected. More active sabotage actions, for example attempts by a tenant to feed an electric current to the loop from its own plug and jack connection, can be prevented (e.g. by a so called "reverse diode") or be tracked (e.g. by means of a transaction memory). The central unit 1 will thus by itself control "off-hook" for the subterminals, and if somebody by mistake should forget to replace his handset and thus accomplish "off-hook" at his substation 5, 5', 5", the loop will not be blocked, but calls made to the called party can be indicated by a buzzer and/or light emitting diodes at the substation 5, 5', 5", or by the terminal unit 6, 6', 6". Also the condition "on-hook" is controlled by the central unit 1 and it is accomplished by interrupting the current feed to the loop.

Regardless of the existing condition at the individual substations 5, 5', 5", the entire loop has status "on-hook" when non-active. It should also be mentioned, that the above described sequence "ABC" also can be changed or compressed without changing the basic function. For example, the PCM-code can be modulated on the alternating current of the ring signal. However, the previously disclosed solution is normally preferred as most practical.

The central unit 1 should preferably cause current feed to the loop, and generate ring signals, according to existing specifications for public subscriber telephone networks. With such an arrangement, conventional telephones can act as substations 5, 5', 5" (with optical/acoustical ring signal indication at the terminal unit 6, 6', 6", it is even possible to "rejack" the ordinary telephone from the telephone network to the terminal unit 6, 6', 6", and thereby obtain "twice as much" from only one telephone). One can also advantageously use existing signal transmission capability for the same result, preferably a tone signalling keypad (even if pulse detection is possible over the all galvanic loop). Furthermore, dedicated substations 5, 5', 5", with required signalling keys, can also be manufactured and offered at a low cost.

With regard to ring signals, it should also be mentioned that the approximately 75 volts required in a conventional telephone network to cause a ring signal may cause problems. As an alternative, a ring signal alternating current of a low voltage type can be chosen, which only causes a signal in the terminal unit. Alternatively, the aforementioned sequence ABC can be transmitted with a higher voltage (e.g. 17–24 V) than the speech current which follows when an entrance call has been established (e.g. 12–16 V). The switch means 7 and the ring device at the subunit is made responsive/operable only at the higher voltage level, while the relay 8 takes up a make position also at the lower level. In this arrangement, the ring signal oscillated out during the C-sequence is replaced, and the ring signal is generated by the fact that the 24 V DC reaches the ring device in the terminal (which then is positioned beside the relay 8 and can include its own shaping device for ring signal generation) and the ring signal stops automatically during the entrance communication. The substation, therefore will not require a ringing device. Furthermore, a "normal" substation can also be permanently connected to a telephone network as well as the terminal unit. The "weak" ring signal will not influence the substation, but at a "signal" from the subterminal, a reply to an entrance call can be made and entrance signalling performed (by means of tone signalling), regardless of the existing communication situation via the telephone network. A certain surveillance logic can be included in the subterminal/substation to differentiate between the two types of communication, for example "put on hold", "call waiting" from the telephone network during entrance communication.

Expensive switching techniques are avoided by the microprocessor's PCM-selection of terminal unit 5, 5', 5", and this results in the lowest cost. Other advantages "built into" microprocessor technology are that separately programmable time zones, code locks and the like easily can be included, and via a connected circuit a certain reprogramming capability for each substation 5, 5', 5" can be allowed by means of predetermined signals transmitted from the keypad of the substation 5, 5', 5". By means of e.g. "serial bus connection" multiple entrance systems are easily arranged. A central unit can also serve a number of individual entrance panels/locks. If a transaction memory is added, mischief, from the entrance as well as the substation side, can easily be traced and attended to.

According to a preferred embodiment of the present invention, the individual substations 5, 5', 5" comprise conventional telephones of the tone signalling type, even though they need not be of a type approved by the local telephone authority, and which are cheap and easily obtainable. Also dedicated substations 5, 5', 5" of a low cost type can obviously be offered. Since the only "data" transmitted on the loop are address codes, the transmission speed is extremely low and for most installations an ordinary simple two-wire (unscreened, non-polarized) "telephoneline" will be sufficient, but for video transmission for example, wiring of the "wideband type" obviously can also be used, such as for example coaxial cable. A coaxial cable can also be compared with a 2-wire circuit, formed partly by the centrally located conductor, partly by the surrounding metallic screen. The central unit 1 utilized will also be of low cost, due to a simple switching technique and a small number of required components. A basically unlimited number of terminal units 6, 6', 6" can freely and whenever desired be connected (and disconnected) to a single loop and central unit 1, restricted only by how many digits are chosen for the address codes. To each terminal, obviously, there can be connected more than one substation.

Figure 2:
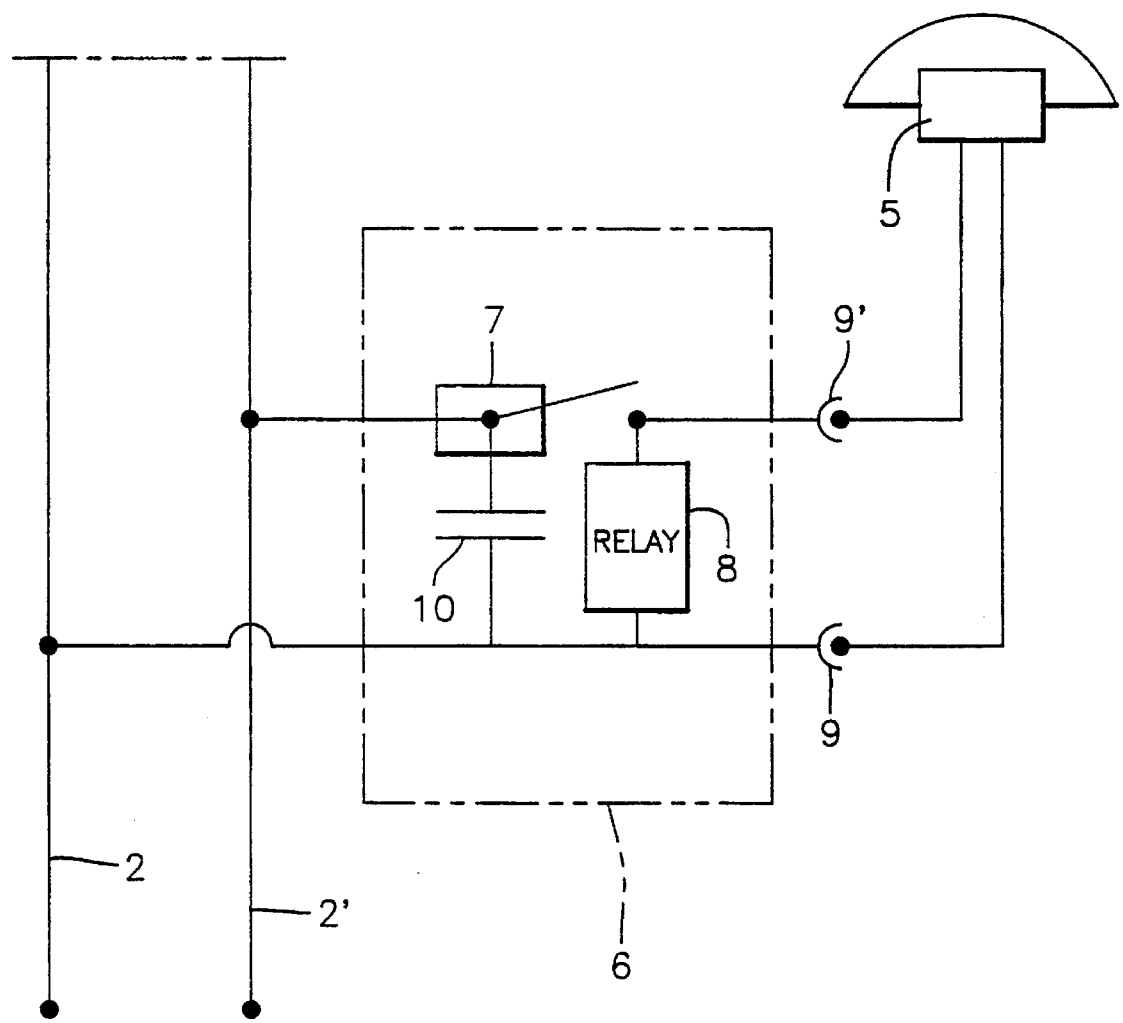
FIG. 2 is a schematical diagram disclosing a substation with associated terminal unit included in the installation shown in FIG. 1.

To avoid numerous individual push buttons for each name in the entrance, a conventional telephone keypad is advantageously used, which also immediately facilitates use of the computer capacity of the central unit 1 for code lock purposes and other desired functions. Mischief such as simultaneous addressing of several tenants from the entrance is made impossible. The terminal unit 6 with associated substation 5 shown schematically and simplified in FIG. 2 includes a PCM-addressable switch means 7 (which can be set for a certain data number), and which controls the make condition for a slow-breaking make-maintaining high-resistive directional relay 8, which maintains a closed position only during a current flow (when current is fed to the loop and the switch means 7 has been correctly addressed). A capacitor 10 is also shown, arranged to facilitate transmission of signals and required basic energy to the PCM-addressable switch means 7. By choosing a slow-breaking relay 8, the risk for disconnection by voltage spikes or the like is avoided, and security is obtained for a call to be maintained until the central unit 1 interrupts the current feed to the loop. Thereafter, the switch shown between 7 and 8 automatically returns to the open resting position shown in FIG. 2. Technically, this can for example be accomplished in such a simple way as arranging the switch between the switch means 7 and the relay 8 having a return spring load, electrically conductive and ferromagnetic, whereby the spring resistance is overcome by influence from the switching means 7, thus causing a make condition, whereafter the relay, acting as an electromagnet, with "delay action" maintains the switch in the closed position as long as a current flow exists. With regard to the circuit solution shown in FIG. 2, it should be emphasized that the solution only should be regraded as a basic example, and that included components advantageously can be integrated into a type of "make before break" compound relay, transistor circuit, IC-logic circuit or the like. The connection 9, 9' for the substation (the telephone) 5 is preferably of the modular female jack type. In the internal current fed loop which is established within the terminal unit 6 when the switching means is influenced into a make condition, there may also be included for example light emitting diodes or the like for optical indication of a call or ring signal, as well as a buzzer, bell or the like for acoustical indication, which can be switched on or off.

As previously mentioned, video or TV-signals can also be transmitted provided that the loop is of wideband type, and individual connection can be performed with the same addressing/logic. An increase or reduction of the number of terminal units 6, 6', 6" can be carried out when and whenever desired, without influencing the function of the loop. In very large systems, the initial and simultaneous supply of current to all switching means during PCM-detection can be excessive. This problem can be solved quite conventionally by using transfer or local amplifiers, or alternatively voltage can be fed to individual current-supplied sections of the loop according to address. By transmission of ring signals in a special frequency (e.g. 3 bursts), entrance calls (apart from the system's own substation 5, 5', 5") can be given a further special identity. This can be of particular value in the case when the substation 5, 5', 5" is a multiline telephone, also having an incoming line from the public telephone network.

The terminal units 6, 6', 6" can obviously also be built into or integrated with the substations 5, 5', 5", but this is a less flexible solution. The terminal units 6, 6', 6" are advantageously designed as a type of telephone jack connection, and can also include "a cradle" for wall mounting of the substation 5, 5', 5". By providing such an arrangement, installation and attachment of the terminal units 6, 6', 6" can be performed as a simple, cheap and fast operation. Should silent "ringing" be desired, indication can be performed by light emitting diodes, and one can also remove the jack connection of the substation 5, 5', 5" when one does not wish to be disturbed. (Alternatively, the buzzer of the terminal unit or similar ringing means can obviously be disconnected.)

In order to more specifically describe the signalling/result, the following can be stated. Even if the central unit 1 quite easily can detect the galvanic change that occurs when the handset of a substation 5, 5', 5" is lifted, it is preferred that one does not use such signalling, since it, on the one hand, does not function well if somebody has forgotten about an "off-hook" at his substation 5, 5', 5", and on the other hand, does not result in 100% security against problems caused by individual changes in the loop or between the various substations 5, 5', 5". Galvanic operative or opening signals should preferably not be used, since such are almost impossible to detect on the same circuit as certain transient speech signals.

Instead it is preferred that active logic signalling from a called substation should guide the response of the central unit 1. As previously described, a substation can only reach and act on the loop if called. A predetermined and uniform logic type signal will thus be specific for the intentions of the called party and no other substation can intrude/block. The preferred type of signalling is tone signalling signalled from the keypad of the called party, even though speech, whistling and other signal types, also including pulsed signalling, can be used. When the central unit 1 transmits a ring signal, a first monitored time period (phase A) is initiated, for example 30 seconds, during which the speech parts are disconnected and the loop is monitored for signals. Lifted handset=reply from the called party, causes according to a preferred embodiment no action, apart from, for example, interruption of further ring signal generation. If no signal, initiated by depression of a certain key performed by the called party, is received within the time period, ring signal generation is interrupted (unless already interrupted as mentioned above) and the current feed to the loop is interrupted, and called subterminal 5, 5', 5" (as well as the entire loop) takes up the "on-hook" resting condition. "No reply" has been indicated and can be passed on to the visitor, regardless of whether or not the called party in fact did lift his handset, but was not willing to accept the call and perhaps performed "on-hook" instead.

If the called party instead depresses for example "0", ring signal generation, connection etc. is interrupted, but "no reply" is not indicated to the visitor until the "phase A" period has elapsed, and since the speech parts are disconnected from the central unit 1 during phase A, the "off-hook" is not observed by the visitor. All the above would also be valid if for example "00" should be selected, but then could also be added a certain time blocking of the called substation number. For example, "99" can cause a local alarm when calls are made in mischief, and other signal configurations can be given special interpretation and response.

However, should the called party decide to accept the call, he may for example depress "1". The ring signals are immediately interrupted (current feed to the loop is maintained) and a new time period, "phase B", for example 30 seconds, is initiated during which the speech communication parts at the entrance center are connected, the visitor is given a reply, and speech communication is established on the loop. Also under this stage monitoring is performed for signals from the substation 5, 5', 5", whereby for example "1" entered during phase B results in unlocking; "0" results in immediate disconnection without lock opening etc. It should be secured, that signalling can not be performed by the visitor, for example by disconnecting the speech communication parts/the keypad of the entrance center initially when the signal is detected. Any signal received hereafter is from the loop=called substation. When an opening operation or the like has been performed, the connection is interrupted and the entrance center (the central unit 1) is ready for new visitors (an electric current is not fed to the loop).

The central unit 1 can also in connection with ring signal generation to selected substation 5, 5', 5" transmit a modulated tone signal, intended to indicate an entrance call to the person that lifts the handset. Such a modification is normally only of interest when the substation 5, 5', 5" on one hand is utilized for entrance calls, and on the other hand also has a connection to the public subscriber telephone network, i.e. when the substation 5, 5', 5" comprises a telephone capable of connection against at least two individual lines.

The loop described above can be regarded as an example of an "ideal" loop. However, there are many locations/ buildings with a geography unsuitable for such wiring. Against the two connection terminals of the central unit 1 there can obviously be connected, for an opposed extreme situation, a number of individual 2-wire circuits 2, 2' extending in different directions, as well as a number from same in different directions extending "secondary loops". As an addition, a loop circuit anywhere may branch into another loop. It should be noted, that modifications as above do not in any way alter the function of the system. Furthermore, if for example a separate "ground connection" is desirable, the loop may include more than 2 wires, even though it is difficult to realize any advantages thereof. However, in those cases that a "loop" according to the invention forms a part of a larger system having an interface to the public telephone network to facilitate for example alarm transmission or the like, the telecommunication authority may specify that speech communication should be performed via 2 wires that meet the technical specifications of the telecommunication authority, whereas "data" should be transmitted via 2 individual wires, i.e. wiring of the 4-wire type (or 3-wire with common ground). Also such requirements can be met without departing from the scope and spirit the invention. For example, in FIG. 2, this would only require an additional wire, which would serve as one pole of the "speech circuit". The wire 2 is maintained (3-wire) or doubled (4-wire) as a common ground, and the wire 2' remains (as "data"-pole). From the above extra wire, a connection wire is arranged to the point (ferromagnetic and conductive) of the switch between elements 7 and 8, which otherwise is not electrically conductive. In this fashion, for a similar connection sequence as before, "data"-current is accomplished by the switching means 7, and "speech"-current is accomplished by the connections 9, 9', and the "data" current feed can be interrupted after an addressing/make condition. This electromechanical basic example can also advantageously be replaced by IC-logic circuits. "Prewired" buildings are often equipped with 2-wire type loops (in certain cases 3-wire, or coaxial cable). Telecommunication wiring to subscribers are often 4-wire, out of which only two are being used (for telephone purposes), and thus two remain unused. A possible "common ground" can also be regarded as an individual conductor for each type of communication. In such buildings only a system according to the present invention facilitates installation of an entrance telephone system with all functions without additional wiring.

With regard to the signalling performed from the central unit 1 when addressing individual terminal units 6, 6', 6", it has been stated with regard to the shown and described embodiment that PCM-signalling is a preferred arrangement. Also other types of signalling can obviously be used, such as various types of pulsed signalling, tone signalling of MFC-type (Multi Frequency Code) or other types, and signalling using alternative voltage levels, which preferably are sent as a sequence of two relatively different levels. Also other previously known signal types can be used.

The substations 5, 5', 5" utilized are as mentioned advantageously quite conventional telephones adapted for tone signalling, but also pulsed signalling can be used, as well as substations 5, 5', 5" of special purpose type, for example having a keypad with each individual key associated with a function, or with combinations of such keys offering alternative functions.

The embodiment shown and described is thus only intended to serve as a basic example of an embodiment, and may thus be further modified within the scope and spirit of the invention and the following claims.

I claim:

1. A method for signalling/communication within an entrance telephone system or the like, intended to facilitate selective communication from an entrance center or central unit to a desired and addressed substation via a loop including at least two conductors, and to also facilitate entrance lock opening or a similar function from such a substation, wherein the central unit, after an approved addressing operation is performed by a visitor, as a first step performs a feeding of work current to the loop joining the central unit and connected substations, and wherein the central unit in connection therewith transmits an address code unique to the addressed substation; wherein said addressed substation by means of a signal detecting means then establishes a galvanical connection between the loop and said addressed substation, and wherein the central unit performs generation of a ring signal, detection of "off-hook" or another like status or signalling changes, and wherein the central unit on detection of an incomplete reply, or terminated entrance telephone communication/function, interrupts the feeding of work current to the loop.

2. An entrance telephone system, including an entrance center or central unit and a plurality of substations, said entrance center or central unit being arranged to facilitate selective communication with a desired and addressed one of said substations via a communication loop including at least two conductors, and also facilitate entrance lock opening or a similar function from such a substation, wherein a work current is only fed to the communication loop after completion of approved addressing of one of said substations wherein said central unit transmits address information to the communication loop as an addressing code unique to the addressed substation, wherein each substation includes a terminal unit with a preprogrammed unit arranged to detect the address information transmitted from the central unit, and on receipt of a correct individual address code connect an associated substation into galvanical connection with the communication loop, said galvanical connection being maintained as long as work current is being fed, and wherein the central unit during a predetermined time period after addressing, monitors the communication loop for an indication of an "off-hook" or another like status or signal changes, and wherein said central unit, after an elapsed time period and non-receipt of said indication, interrupts feeding of the work current to the communication loop, and when such an indication is obtained, monitors for an indication of an "on-hook" or another like status or function signals, and in response thereto performs a corresponding function and/or interrupts feeding of the work current to the communication loop.

3. The entrance telephone system according to claim 2, wherein said address information from the central unit is transferred using a signalling type different from a signalling type used by the substations connected to the communication loop to influence the central unit during said galvanical connection in order to initiate entrance lock opening or another like function.

4. The entrance telephone system according to claim 2, wherein said substations are arranged to accomplish tone signalling while said galvanical connection exists in order to influence the central unit to initiate entrance lock opening or another like function, and wherein said substations comprise telephones with a keypad for tone signalling.

5. The entrance telephone system according to claim 2, wherein said communication loop with at least two conductors comprises a two-wire conductor of the type typically used for telephone wiring.

6. The entrance telephone system according to claim 2, wherein said communication loop with at least two conductors comprises a coaxial cable having a central conductor and a surrounding metallic screen.

7. The entrance telephone system according to claim 2, wherein the central unit, after completing connection of the work current to the communication loop and addressing a certain one of said substations, during a predetermined period of time performs ring signal generation to the communication loop while monitoring for status changes relating to "off-hook" and/or receipt of predetermined signals from said certain one of the substations, intended to indicated disconnection with interruption of the feeding of work current to the communication loop or acceptance of an entrance call.

8. The entrance telephone system according to claim 2, wherein said address information from the central unit is transmitted on the communication loop using PCM-signalling.

9. The entrance telephone system according to claim 2, wherein one of said substations is arranged, while said galvanical connection is established from the central unit, to perform, using signalling from said one of the substations, selections such as disconnection of an addressing capability during a predetermined time period, disconnection without verbal communication with a calling party, or other similar functions.

10. The entrance telephone system according to claim 2, wherein said communication loop apart from verbal communication and signalling also is arranged to facilitate video or TV-communication.

11. The entrance telephone system according to claim 2, wherein the central unit is preprogrammed to directly initiate and facilitate entrance lock opening when addressed with a predetermined code sequence by influencing an electrically operable entrance door lock connected to the central unit.

12. The entrance telephone system according to claim 2, wherein at least one additional conductor is included in the communication loop to provide separate conductors for data and speech communication.

* * * * *